US008031343B2

United States Patent
Carothers et al.

(10) Patent No.: US 8,031,343 B2
(45) Date of Patent: Oct. 4, 2011

(54) HIGH-INDEX CONTRAST WAVEGUIDE OPTICAL GYROSCOPE HAVING SEGMENTED PATHS

(75) Inventors: Daniel N. Carothers, Oro Valley, AZ (US); Jefferson E. Odhner, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 79 days.

(21) Appl. No.: 12/525,965

(22) PCT Filed: Aug. 29, 2008

(86) PCT No.: PCT/US2008/074717
§ 371 (c)(1),
(2), (4) Date: Aug. 5, 2009

(87) PCT Pub. No.: WO2009/058469
PCT Pub. Date: May 7, 2009

(65) Prior Publication Data
US 2010/0328673 A1 Dec. 30, 2010

Related U.S. Application Data

(60) Provisional application No. 61/000,830, filed on Oct. 29, 2007.

(51) Int. Cl.
*G01C 19/72* (2006.01)
(52) U.S. Cl. ...................................... 356/461
(58) Field of Classification Search ........... 356/460–466
See application file for complete search history.

(56) References Cited

U.S. PATENT DOCUMENTS

| 4,420,258 | A | | 12/1983 | Burns et al. |
| 4,547,072 | A | | 10/1985 | Yoshida et al. |
| 4,630,885 | A | * | 12/1986 | Haavisto .......................... 385/30 |
| 4,639,138 | A | * | 1/1987 | Martin et al. .................. 356/460 |
| 4,748,617 | A | | 5/1988 | Drewlo |
| 4,815,853 | A | * | 3/1989 | Lefevre ........................ 356/462 |

(Continued)

FOREIGN PATENT DOCUMENTS

EP    0 818 693    1/1998

(Continued)

OTHER PUBLICATIONS

Pruessner et al., "InP-Based Optical Waveguide MEMS Switches with Evanescent Coupling Mechanism", Journal of Microelectromechanical Systems, vol. 14, No. 5, Oct. 2005.

(Continued)

*Primary Examiner* — Tarifur Chowdhury
*Assistant Examiner* — Jonathon Cook
(74) *Attorney, Agent, or Firm* — Yudell Isidore Ng Russell PLLC; Daniel J. Long

(57) ABSTRACT

A waveguide optical gyroscope is disclosed. The waveguide optical gyroscope includes a laser, two detectors, a set of couplers and a set of waveguides. The laser generates a light beam. A first waveguide guides the light beam to travel in a first direction, and a second waveguide guides the light beam to travel in a second direction. The first and second waveguides are coupled to several ring waveguides via the couplers. The first detector detects the arrival of the light beam traveling from the first waveguide, and the second detector detects the arrival of the light beam traveling from the second waveguide.

8 Claims, 3 Drawing Sheets

U.S. PATENT DOCUMENTS

| | | | |
|---|---|---|---|
| 4,921,354 A | | 5/1990 | SooHoo |
| 5,146,292 A | * | 9/1992 | Buehler et al. .......... 356/466 |
| 5,165,001 A | | 11/1992 | Takagi et al. |
| 5,184,195 A | * | 2/1993 | Goldner .......... 356/462 |
| 5,281,805 A | | 1/1994 | Sauer |
| 5,371,591 A | | 12/1994 | Martin et al. |
| 5,430,755 A | | 7/1995 | Perlmutter |
| 5,493,433 A | * | 2/1996 | Prucnal et al. .......... 398/98 |
| 5,555,088 A | * | 9/1996 | Valette .......... 356/465 |
| 5,625,636 A | | 4/1997 | Bryan et al. |
| 5,674,778 A | | 10/1997 | Lee et al. |
| 5,703,989 A | | 12/1997 | Khan et al. |
| 5,736,461 A | | 4/1998 | Berti et al. |
| 5,828,476 A | | 10/1998 | Bonebright et al. |
| 5,834,800 A | | 11/1998 | Jalali-Farahani et al. |
| 6,117,771 A | | 9/2000 | Murphy et al. |
| 6,242,324 B1 | | 6/2001 | Kub et al. |
| 6,331,445 B1 | | 12/2001 | Janz et al. |
| 6,387,720 B1 | | 5/2002 | Misheloff et al. |
| 6,400,996 B1 | | 6/2002 | Hoffberg et al. |
| 6,477,285 B1 | | 11/2002 | Shanley |
| 6,605,809 B1 | | 8/2003 | Engels et al. |
| 6,677,655 B2 | | 1/2004 | Fitzergald |
| 6,680,495 B2 | | 1/2004 | Fitzergald |
| 6,738,546 B2 | | 5/2004 | Deliwala |
| 6,785,447 B2 | | 8/2004 | Yoshimura et al. |
| 6,795,622 B2 | | 9/2004 | Forrest et al. |
| 6,850,252 B1 | | 2/2005 | Hoffberg |
| 6,861,369 B2 | | 3/2005 | Park |
| 6,936,839 B2 | | 8/2005 | Taylor |
| 6,968,110 B2 | | 11/2005 | Patel et al. |
| 7,006,881 B1 | | 2/2006 | Hoffberg et al. |
| 7,010,208 B1 | | 3/2006 | Gunn, III et al. |
| 7,043,106 B2 | | 5/2006 | West et al. |
| 7,072,556 B1 | | 7/2006 | Gunn, III et al. |
| 7,082,247 B1 | | 7/2006 | Gunn, III et al. |
| 7,103,252 B2 | | 9/2006 | Ide |
| 7,106,448 B1 | * | 9/2006 | Vawter et al. .......... 356/461 |
| 7,139,448 B2 | | 11/2006 | Jain et al. |
| 7,215,845 B1 | | 5/2007 | Chan et al. |
| 7,218,809 B2 | | 5/2007 | Zhou et al. |
| 7,218,826 B1 | | 5/2007 | Gunn, III et al. |
| 7,259,031 B1 | | 8/2007 | Dickinson et al. |
| 7,272,279 B2 | | 9/2007 | Ishikawa et al. |
| 7,315,679 B2 | | 1/2008 | Hochberg et al. |
| 7,333,679 B2 | | 2/2008 | Takahashi |
| 7,348,230 B2 | | 3/2008 | Matsuo et al. |
| 7,356,221 B2 | | 4/2008 | Chu et al. |
| 2003/0026546 A1 | | 2/2003 | Deliwala |
| 2003/0183825 A1 | | 10/2003 | Morse |
| 2004/0146431 A1 | | 7/2004 | Scherer et al. |
| 2004/0190274 A1 | | 9/2004 | Saito et al. |
| 2005/0094938 A1 | | 5/2005 | Ghiron et al. |
| 2006/0105509 A1 | | 5/2006 | Zia et al. |
| 2006/0158723 A1 | | 7/2006 | Voigt et al. |
| 2006/0232782 A1 | | 10/2006 | Kristal et al. |
| 2006/0238866 A1 | | 10/2006 | Von Lerber |
| 2006/0240667 A1 | | 10/2006 | Matsuda et al. |
| 2007/0116398 A1 | | 5/2007 | Pan et al. |
| 2007/0202254 A1 | | 8/2007 | Ganguli et al. |
| 2007/0206196 A1 | | 9/2007 | Heffner et al. |
| 2008/0159751 A1 | | 7/2008 | Matsui et al. |
| 2008/0240180 A1 | | 10/2008 | Matsui et al. |
| 2009/0244544 A1 | * | 10/2009 | Terrel et al. .......... 356/461 |

FOREIGN PATENT DOCUMENTS

| | | |
|---|---|---|
| EP | 1 067 409 | 1/2001 |
| WO | 9314514 | 7/1993 |
| WO | 0127669 | 4/2001 |
| WO | 0216986 | 2/2002 |
| WO | 2004088724 | 10/2004 |
| WO | 2007149055 | 12/2007 |

OTHER PUBLICATIONS

May et al., "Integrated Process for Silicon Nitride Waveguide Fabrication", IBM Technical Disclosure Bulletin, vol. 33, No. 2, Jul. 1990.

Matsushita et al., "Narrow CoSi2 Line Formation on SiO2 by Focused Ion Beam", IEEE Xplore 1999.

"Process Integration", Cobalt Self-aligned Silicide Process, Chapter 13.

Liu et al., "Design of Monolithically Integrated GeSi Electro-absorption Modulators and Photodetectors on an SOI Plaform", Optics Express 623, vol. 15, No. 2, Jan. 22, 2007.

Fijol et al., "Fabrication of Silicon-on-insulator Adiabatic Tapers for Low Loss Optical Interconnection of Photonic Devices".

Yap et al., "Integrated Opteoelectronic Circuits with InP-based HBTs", Proceedings of SPIE, vol. 4290, 2001.

Roth, "Electroabsorption Modulators for CMOS Compatible Optical Interconnects in III-V and Group IV Materials", Aug. 2007, (part 1 of 3).

Roth, "Electroabsorption Modulators for CMOS Compatible Optical Interconnects in III-V and Group IV Materials", Aug. 2007, (part 2 of 3).

Roth, "Electroabsorption Modulators for CMOS Compatible Optical Interconnects in III-V and Group IV Materials", Aug. 2007, (part 3 of 3).

Kimberling et al., "Electronic-photonic integrated Circuits on the CMOS Platform".

Chao et al., "Analysis of Temperature Profiles of Thermo-optic Waveguides", Fiber and Integrated Optics, vol. 33.

Okyay et al., "Silicon Germanium CMOS Optoelectronic Switching Device: Bringing Light to Latch", IEEE Transactions on Electron Devices, vol. 54, No. 12, Dec. 2007.

McAulay et al., "All-optical Switching and Logic with an Integrated Optic Microring Resonator", Proc. of SPIE vol. 5814.

Kik et al, "Erbium Doped Optical Waveguide Amplifiers on Silicon", MRS Bulletin 23(4), 48, Apr. 1998.

Kimmet, J. S., "M.S. Thesis: Integrated Circuit Fabrication Details," Rutgers University, 1999; 18 pp.

* cited by examiner

HIGH-INDEX CONTRAST WAVEGUIDE OPTICAL GYROSCOPE HAVING SEGMENTED PATHS

PRIORITY CLAIM

The present application claims benefit of priority under 35 U.S.C. §365 to the previously filed international patent application number PCT/US08/074717 filed on Aug. 29, 2008, assigned to the assignee of the present application, and having a priority date of Oct. 29, 2007, based upon U.S. provisional patent application No. 61/000,830. The contents of both applications are incorporated herein by reference.

STATEMENT OF GOVERNMENT INTEREST

The present invention was made with United States Government assistance under Contract No. HR0011-05-C-0027 awarded by Defense Advanced Research Projects Agency (DARPA). The United States Government has certain rights in the present invention.

BACKGROUND OF THE INVENTION

1. Technical Field

The present invention relates to optical gyroscopes in general, and in particular to high-performance waveguide optical gyroscopes.

2. Description of Related Art

Optical gyroscopes can sense rotation by measuring the difference in time for two light beams (or other electromagnetic waves) to pass in opposite directions through a common loop path. During rotation, the two opposite light beams within an optical gyroscope are out of phase. Specifically, the light beam moving in the direction of rotation will arrive at a detector at a later time than the light beam moving in opposite to the direction of rotation. Thus, by measuring the phase difference between the two opposite light beams within the optical gyroscope, rotation information can be obtained.

However, if the two opposite light beams within the optical gyroscope are only slightly out of phase, then the change in phase difference between the two opposite light beams may not be significant enough to be measured by a detector. For example, prior art optical gyroscopes tend to have less than optimal performance because they are not able to measure very small changes in phase difference between two opposite light beams. Consequently, it would be desirable to provide an improved optical gyroscope having higher detection capabilities.

SUMMARY OF THE INVENTION

In accordance with a preferred embodiment of the present invention, a waveguide optical gyroscope includes a laser, two detectors, a set of couplers and a set of waveguides. The laser generates a light beam. A first waveguide guides the light beam to travel in a first direction, and a second waveguide guides the light beam to travel in a second direction. The first and second waveguides are coupled to several ring waveguides via the corresponding couplers. The first detector detects the arrival of the light beam traveling from the first waveguide, and the second detector detects the arrival of the light beam traveling from the second waveguide.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

As mentioned previously, when two opposite light beams within an optical gyroscope are only slightly out of phase, the phase difference between the two opposite light beams may not be significant enough to be measured by a detector. This is because the light intensity does not vary enough to cause any noticeable change in the phase difference between the two opposite light beams, and such point represents a point of almost zero slope on a graph of light intensity versus phase difference. Sensitivity, however, can be greatly increased by shifting the phase of one of the two opposite light beams by 90 degrees, so that the detector will be operating at a point of maximum slope on the graph of light intensity versus phase difference. As a result, small variations in phase difference can result in large variations in light intensity.

Figure 1:
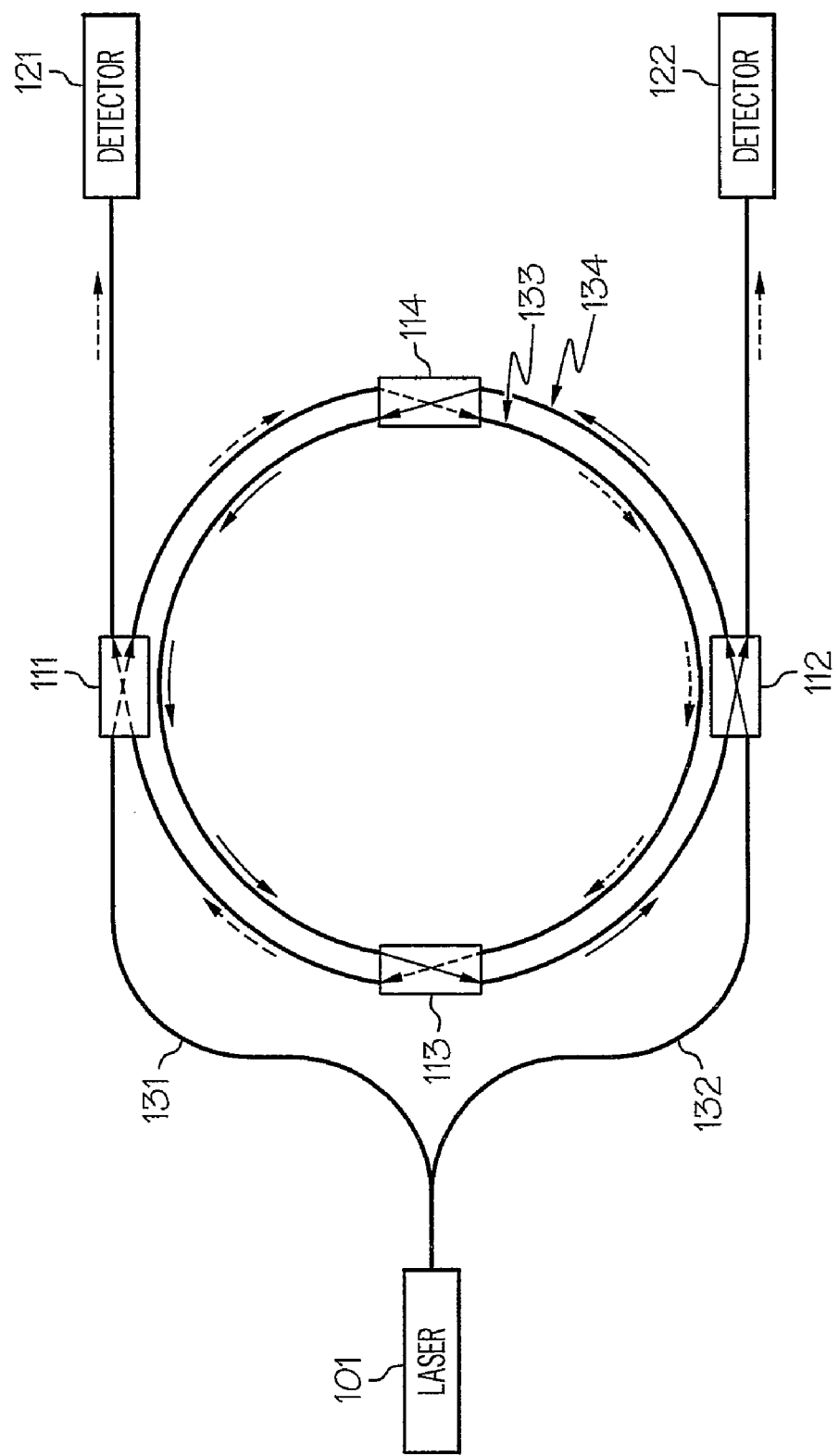
FIG. 1 is a diagram of a waveguide optical gyroscope having segmented paths, in accordance with a preferred embodiment of the present invention.

Referring now to the drawings and in particular to FIG. 1, there is illustrated a diagram of a waveguide optical gyroscope having segmented paths, in accordance with a preferred embodiment of the present invention. As shown, a waveguide optical gyroscope 100 includes a laser 101, four tunable couplers 111-114 and detectors 121-122. Couplers 111-112 are 15% to 90% couplers, and couplers 113-114 are 90% couplers. Couplers 111-114 control the coupling coefficient and phases of the light beam.

Waveguide optical gyroscope 100 also includes multiple waveguides connected between laser 101 and detectors 121-122. For example, waveguide optical gyroscope 100 includes linear waveguides 131-132 and circular waveguides 133-134. Waveguide 131 is connected between laser 101 and detector 121, and waveguide 132 is connected between laser 101 and detector 122. Each of waveguides 133 and 134 is in the form of a ring coupled to each other and to waveguides 131 and 132. For example, waveguides 133 and 134 are coupled to each other via couplers 113 and 114, and waveguide 133 is coupled to waveguides 131 and 132 via couplers 111 and 112. Waveguides 131-134 are made of high-index contrast materials. The usage of high-index contrast couplers allows the rotation induced phase shifts to be converted into a power variation with a resonator structure itself. The greater the number of couplers within the ring structure, the greater the amplitude change versus rotation induced phase shift.

Laser 101 generates a light beam. Waveguide 131 guides the light beam to travel in a first direction, and waveguide 132 guides the light beam to travel in a second direction. Detector 121 detects the arrival of the light beam traveling from waveguide 131, and detector 122 detects the arrival of the light beam traveling from waveguide 132. The phase different between waveguide 131 and waveguide 132 is 90 degrees.

When the light beam traveling in the first direction within waveguide 131 arrives at coupler 111, a portion of the light beam is coupled to ring waveguide 133 that guides the light beam to travel in a clockwise direction (indicated as dotted arrows). When the light beam traveling in the clockwise direction within waveguide 133 arrives at coupler 114, most, if not all, of the light beam is coupled to ring waveguide 134 that also guides the light beam to travel in the clockwise direction. When the light beam traveling in the clockwise direction within waveguide 134 arrives at coupler 113, most, if not all, of the light beam is coupled back to ring waveguide 133. When the light beam traveling in the clockwise direction within waveguide 133 arrives at coupler 111 again, a portion of the light beam is coupled back to waveguide 131.

Similarly, when the light beam traveling in the second direction within waveguide 132 arrives at coupler 112, a portion of the light beam is coupled to ring waveguide 134 that guides the light beam to travel in an anti-clockwise direction (indicated as solid arrows). When the light beam traveling in the anti-clockwise direction within waveguide 134 arrives at coupler 114, most, if not all, of the light beam is coupled to ring waveguide 133 that also guides the light beam to travel in the anti-clockwise direction. When the light beam traveling in the anti-clockwise direction within waveguide 133 arrives at coupler 113, most, if not all, of the light beam is coupled back to ring waveguide 134. When the light beam traveling in the anti-clockwise direction within waveguide 134 arrives at coupler 112 again, a portion of the light beam is coupled to waveguide 132.

Like most waveguide optical gyroscopes, waveguide optical gyroscope 100 exploits the Sagnac effect that describes the counter-rotating optical radiation in a ring, which induces a phase difference as the ring is being rotated. Such phase difference is proportional to the rate of rotation. Ring waveguides 133, 134 within waveguide optical gyroscope 100 are less than 1 cm in diameter. The Sagnac effect is multiplied by a laser beam going around ring waveguides 133, 134 multiple times, and this multiplication is enabled by a high-index contrast segmented path approach of the present invention.

High-index contrast structures are utilized to fabricate waveguide optical gyroscope 100 based on the modification of optical phase within a ring structure. The segmented paths of waveguide optical gyroscope 100 enable multiple revolutions of the light beam without detrimental interactions with outside couplers. Coupler steering affects utilized to detect small optical phase variations within the compact coupler need co-propagating radiation of the same wavelength to occur. As a result, the effect on internal couplers 111-114 should be null.

The fixed phase variation induced by rotation within waveguide optical gyroscope 100 can be monitored by measuring the amplitude of the induced steering effect within couplers 111-114.

Figure 2:
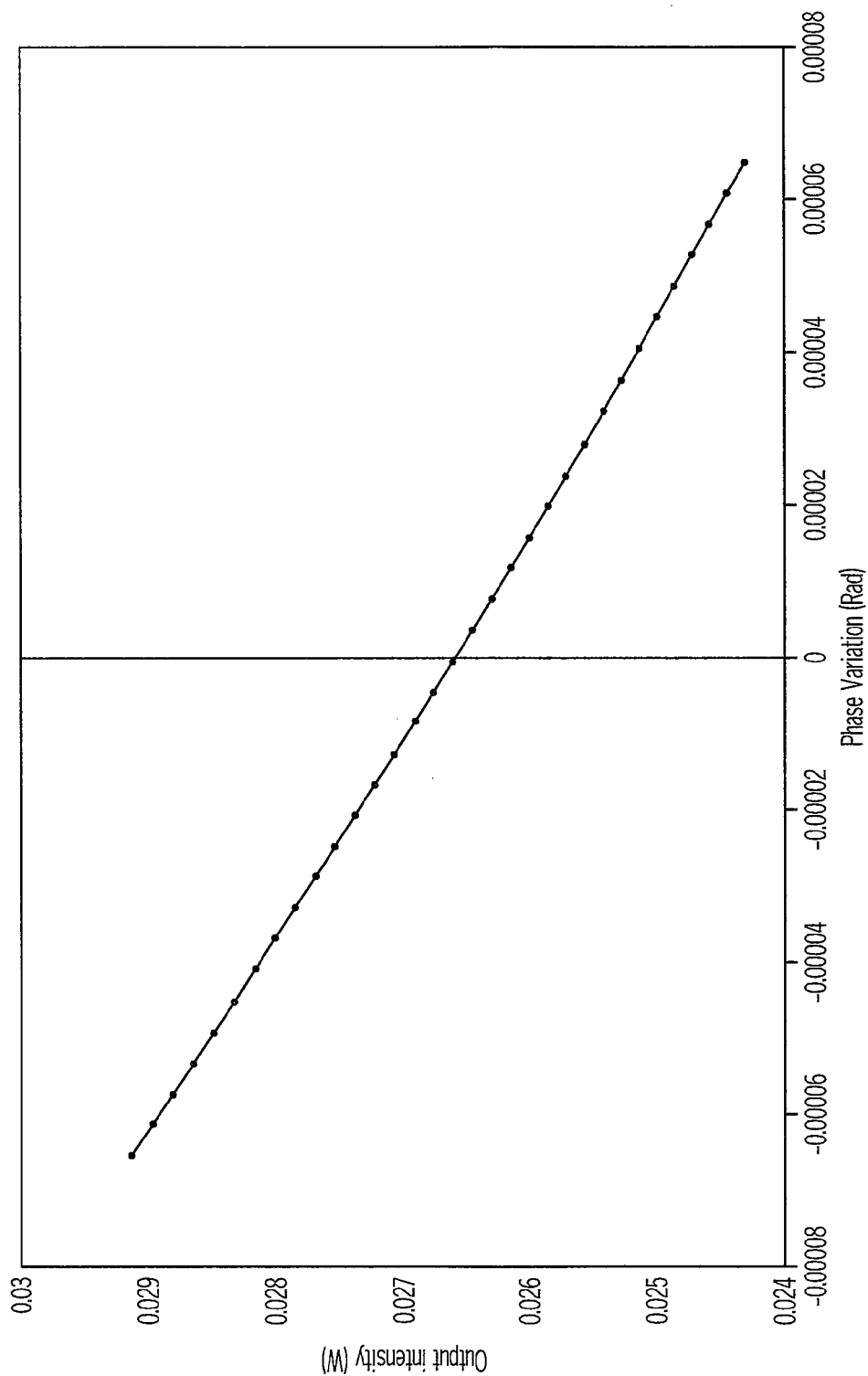
FIG. 2 is a graph of optical power output versus phase variation at a coupler input within the waveguide optical gyroscope from FIG. 1, in accordance with a preferred embodiment of the present invention.

With reference now to FIG. 2, there is depicted a graph of optical power output versus phase variation at a coupler input of waveguide optical gyroscope 100 from FIG. 1, such as coupler 111, in accordance with a preferred embodiment of the present invention. As shown in FIG. 2, the amplitude change developed by the effective phase change of the optical frequency as it interacts with the input phase.

Figure 3:
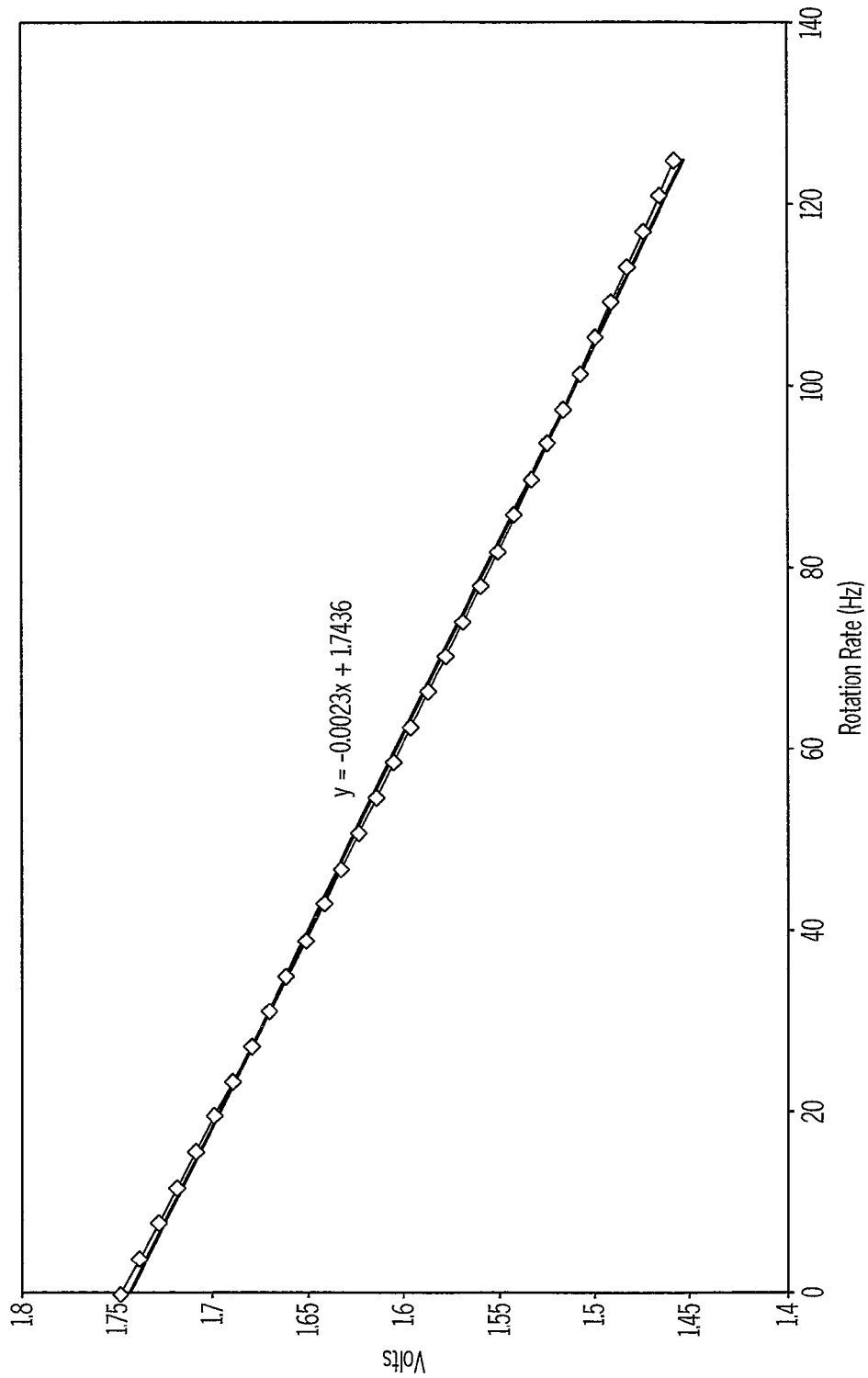
FIG. 3 is a graph of voltage output versus rotational rate of the waveguide optical gyroscope from FIG. 1, in accordance with a preferred embodiment of the present invention.

Referring now to FIG. 3, there is depicted a graph of output voltage versus rotational rate at a coupler input of waveguide optical gyroscope 100 from FIG. 1, in accordance with a preferred embodiment of the present invention. As shown in FIG. 3, at each of detectors 121 and 122 (from FIG. 1), for the measured configuration (3500 um diameter with TIA gain of 100 ohms using germanium detector), the rotational sensitivity is 0.0023 Volts/Hz. For the typical differential gyroscope, this will be two times this value as there is an equal and opposite signal contribution from each coupler.

As has been described, the present invention provides an improved waveguide optical gyroscope having segmented paths. The usage of segmented paths allow light to be confined within a true single path, preventing back coupling into an emitter. The waveguide optical gyroscope of the present invention allows larger interaction cross-sections in terms of the Sagnac effect and allow even greater device scaling while allowing improved or similar performance. The waveguide optical gyroscope of the present invention allows close pack the guides without cross coupling, which can further enable extremely long effective optical lengths by close packing of the waveguides in the cross-coupled rings.

There are several benefits to the segmented path approach of the present invention. It can detect small optical phase variations. It provides phase variations in couplers to affect amplitude changes through the phase "steering of the beam." It can bypass couplers where undesirable power loss may occurred. It can direct a light beam through a controllably long rotational path, such as providing 400 rotations for an optical gyroscope having a 3 mm diameter loop.

While the invention has been particularly shown and described with reference to a preferred embodiment, it will be understood by those skilled in the art that various changes in form and detail may be made therein without departing from the spirit and scope of the invention.

What is claimed is:

1. An optical gyroscope comprising:
   a laser for generating a light beam;
   a plurality of couplers;
   a first waveguide, connected to said laser, for guiding said light beam to travel in a first direction;
   a second waveguide, connected to said laser, for guiding said light beam to travel in a second direction;
   a first and second ring waveguides coupled to said first and second waveguides, respectively, via two of said plurality of couplers, wherein said first and second ring waveguides are directly optically coupled to each other via another two of said plurality of couplers;
   a first detector, connected to said first ring waveguide, for detecting the arrival of said light beam from said first waveguide; and
   a second detector, connected to said second ring waveguide, for detecting the arrival of said light beam from said second waveguide.

2. The optical gyroscope of claim 1, wherein an initial phase difference between said light beam in said first waveguide and said light beam in said second waveguide is 90 degrees.

3. The optical gyroscope of claim 1, wherein said two couplers optically couples said first and second waveguides to segments of said first and second ring waveguides, respectively.

4. The optical gyroscope of claim 3, wherein said two couplers are 15%-90% couplers.

5. The optical gyroscope of claim 1, wherein said another two couplers optically couples segments of said first and second ring waveguides.

6. The optical gyroscope of claim 5, wherein said another two couplers are 90% couplers.

7. The optical gyroscope of claim 1, wherein said first direction is different from said second direction.

8. The optical gyroscope of claim 1, wherein said couplers control coupling coefficient and phases of said light beam.

* * * * *